3,328,332
PROCESS FOR SOLUTION POLYMERIZATION OF ACRYLONITRILE
Clarence C. Dannelly and John R. Caldwell, Kingsport, Tenn., assignors to Eastman Kodak Company, Rochester, N.Y., a corporation of New York
No Drawing. Filed Oct. 23, 1965, Ser. No. 504,171
21 Claims. (Cl. 260—30.4)

This application is a continuation-in-part of our copending application Ser. No. 270,142, filed Apr. 3, 1963, and now abandoned.

This invention relates to a new and improved polymerization process for preparing resinous polymers of acrylonitriles. In one of its aspects this invention relates to the preparation of polyacrylonitrile and copolymers containing at least 50% by weight of acrylonitrile, employing a specific catalyst system in an organic liquid which is a solvent for the polymer.

The problems and descriptions of the products of polymerization of acrylonitrile in solution with customary catalysts are discussed in several publications. For example, W. M. Thomas et al. have reported in Journal of Polymer Science, 17, 275 (1955) that the polymerization of acrylonitrile in ethylene carbonate and in dimethylformamide, using azobix(butyronitrile) as the catalyst, resulted in polymer yields of 44% and 30%, respectively, the latter process giving a product having an intrinsic viscosity of but 0.5. This result was attributed therein the fact that interaction had occurred with the dimethylformamide, i.e. chain transfer and retardation fully accounted for low reaction rates and the low molecular weights of the products obtained in dimethylformamide. As another example, British Patent No. 849,864 has proposed the use of ammonium persulfate as a single catalyst for polymerizing acrylonitrile in solution in dimethylformamide. However, it has been found that the process of this patent is not wholly satisfactory for commercial operation because of the necessity of using a temperature of 50° C. or above and for times in excess of 35 hours. The process of the invention does not have these limitations. The process of the invention actually gives better than 85% yield of polymer when using temperatures in the preferred range of about from 20–50° C., in a period of only from 2.5–4 hours. The polymer obtained is essentially colorless and the molecular weights are controllable and intrinsic viscosity values can be obtained, as desired, in the range of from 0.5–2.5. These important advantages of the process of the invention are believed to be due to the presence of both the metal or metal ions and the oxidizing agent.

Acrylonitrile has also been polymerized with free radical catalysts not including any metal or metal ion as a part of the polymerization catalyst. In some instances the catalysts have been in the form of multiple component systems such as the persulfate ion-bisulfite ion system in water. In other instances certain heavy metal ions such as copper have been used with persulfate or perphosphate ions as polymerization catalysts, but these catalysts have also been employed in water solutions at a particular pH. In those instances where homopolymers or copolymers of acrylonitrile have been prepared in solvents for the polymer, for example, dimethylsulfoxide, persulfate or ultraviolet light have been used to initiate the polymerization. Usually metals or metal ions have not been used in these catalyst systems and relatively low yields of polymer have been obtained. These low yields must be contrasted with the yields obtained in the practice of our invention which can be as high as 97% and higher based on the monomers being polymerized.

It is an object of the invention to provide an improved process for preparing acrylonitrile polymers in an organic liquid which is a solvent for the polymer. Another object is to provide a new catalyst combination for accelerating the polymerization reaction composed of gold, platinum, palladium and iridium containing catalysts in combination with a suitable oxidizing agent. Another object is to provide a solvent polymerization process for making acrylonitrile polymers that produces polymers having relatively high molecular weights, excellent color and low catalyst residues. Other objects will become apparent from the description and examples.

In accordance with the invention, the polymerizations of acrylonitrile alone or together with comonomer is carried out in a solution process, and the polymer can be extruded or spun directly from the solution without prior separation or recovery of the polymer from the reaction medium. One general method of practicing the invention consists of mixing or dissolving acrylonitrile monomer in organic liquids which are good solvents for polyacrylonitrile, for example, N,N-dimethylformamide, N,N-dimethylacetamide, γ-butyrolactone, ethylene carbonate and dimethylsulfoxide, as well as in various mixtures of these solvents with each other in any proportions, and in mixtures of these solvents with up to 25% of other solvents such as lower alkanols, ketones, hydrocarbons and in particular acetonitrile. The relative proportion of monomer to solvent is advantageously in the range of from 5–60% by weight of acrylonitrile, based on the total weight of the mixture. The usual and preferred range is from 10–40% by weight of monomer. The preferred solvent for the process of the invention is N,N-dimethylformamide, which produces very satisfactory polymer solutions of both polyacrylonitrile and the copolymers of acrylonitrile, for example, with alkyl acrylates and methacrylates. The gold, platinum, palladium or iridium containing catalyst in the form of a fine dispersion of the metal or in the form of their salts, e.g. the halides, oxides or hydroxides, sulfates, etc., but more especially auric chloride, chloroplatinic acid, palladium chloride and iridium dichloride, is then added to the mixture. Of these, the preferred catalyst is auric chloride. The salt or metal need not be soluble in the reaction mixture for the process to be operable. The useful range of the metal or salt is about from 0.0001–3.0%, preferably from 0.001–1.0%, based on the weight of the monomer. This mixture is stirred under an inert atmosphere, for example, nitrogen and an oxidizing agent is added. The preferred oxidizing agents are the salts and acids of peroxysulfuric acid. These include Caro's acid ($H_2SO_5$) or monoperoxysulfuric acid, peroxydisulfuric acid, the ammonium and alkali-metal salts such as, for example, ammonium, potassium or sodium persulfate, etc., and sulfur tetroxide which, under certain conditions of low temperature and traces of water, reacts to give a suitable oxidizing agent. However, the preferred specific oxidizing agent is potassium persulfate. In some instances, the oxidizing agent can advantageously be made in the reaction mixture, for example, using sulfuric acid and hydrogen peroxide to generate Caro's acid. The quantity of the oxidizing agent used can be varied in accordance with the desired reaction rate, the characteristics of the oxidizing agent and the desired molecular weight of the resultant polymer. The desired range is based on the peroxy oxygen (—O—O—) which is apparently available in the formulas of Caro's acid and sulfodiperacid. The useful range of the oxidizing agent is about from 0.025–2.0%, based on the monomer weight.

The final mixture is then stirred under nitrogen at temperatures in the range of from −70 to 100° C., but preferably in the range of from 20–50° C. Depending on the temperature, the amount of catalyst used, and to a slight extent on the solvent, a high yield of polyacrylonitrile forms in a period of from 0.5–24 hours. In the preferred temperature and catalyst ranges, the time for substantially complete polymeization of the monomer requires only about from 2.5–4 hours. Under some lowered temperature conditions, the newly formed polymer may not be soluble as formed but dissolves on heating to normal temperatures, for example, if the polymerization is done in N,N-dimethylformamide below 30° C. The polymer readily dissolves on heating the mixture to 40° C. Depending on the solvent and the desired procedure, the solutions prepared as above described are then shaped into films or fibers by solvent evaporation or extraction using specific techniques known to the art.

In our process we obtain yields of at least 85% by weight of polymer based on the monomeric material charged to the process in 2 to 24 hours at temperatures of −50 to 50° C. The intrinsic viscosity of the polymer is within the range of 0.9–2.5 and the color of 0.005 inch thick film produced from the solution produced in our process is less than the color of a 0.5 inch layer of platinum cobalt chloride solution containing 500 p.p.m. of platinum.

Another method of practicing the process of the invention is to use the processes and materials described supra for the preparation of polyacrylonitrile to make useful copolymers of acrylonitrile. The only difference from the foregoing procedure is that the starting monomers for the process are mixtures of acrylonitrile and one or more other monoethylenically unsaturated, polymerizable compounds or comonomers containing a

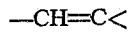

group, and more especially a $CH_2=C<$ group. Suitable comonomers include vinyl, isopropenyl and allyl esters of carboxylic acids containing from 2–7 carbon atoms, e.g. vinyl acetate, vinyl propionate, vinyl butyrate, vinyl benzoate, etc., and the corresponding isopropenyl and allyl esters, allyl alcohol, allyl acryates and methacryates wherein the alky group contains from 1 to 10 carbon atoms, e.g., methy acrylate, ethyl acrylate, butyl acrylate, tertiary butyl acrylate, hexyl acrylate, decyl acrylate, etc., and the corresponding methacrylates, alicyclic acrylates and methacrylates wherein the alicyclic group contains 5–8 or more carbon atoms, e.g. cyclopentyl acrylate, cyclohexyl acrylate, 2-norcamphanyl methacrylate, etc., vinyl halides, e.g. vinyl chloride, vinyl bromide and vinyl fluoride, vinylidene halides, e.g. vinylidene chloride, vinylidene bromide, vinylidene chloride-bromide, vinylidene fluoride, etc., acrylamide, methacrylamide, N-alkyl substituted acrylamides and methacrylamides wherein the alkyl groups contain from 1–4 carbon atoms e.g. N-methyl acrylamide, N-isopropylacrylamide, N-butylacrylamide, N,N-dimethylacrylamide, N,N-diisopropylacrylamide, etc., and the corresponding methacrylamides, methacrylonitrile, styrenes, e.g. styrene, α-methylstyrene, α-acetoxystyrene, p-methylstyrene, p-acetaminostyrene, etc., vinyl pyridines, e.g. 2-vinylpyridine, 4-vinylpyridine, etc., N-vinyl lactams, e.g. N-vinyl pyrrolidone, etc. acrylic acid, methacrylic acid, α-chloroacrylic acid and salts of these acids, cyclic imides, e.g. vinyl succinimide, vinyl phthalimide, etc., vinyl alkyl ketones, vinyl alkyl ethers, N-vinyl alkyl urethanes wherein in each instance the alkyl group contains from 1–4 carbon atoms, e.g. vinyl methyl ketone, vinyl ethyl ketone, vinyl butyl ketone, vinyl methyl ether, vinyl butyl ether, N-vinyl ethylurethane, N-vinyl butylurethane, etc., vinyl sulfonamides, e.g. vinyl sulfonamide, N-vinyl methyl sulfonamide, N-vinyl butyl sulfonamide, etc., vinylsulfonic acid, allyl sulfonic acid, and alkali metal salts of these acids such as sodium salt of vinylsulfonic acid, etc., the unsaturated acid sulfates and phosphates, e.g. sodium allyl sulfate, disodium allyl phosphate, and other groups of this nature that are known to impart affinity for basic dyes, maleic, fumaric, itaconic and citraconic acids, dialkyl maleates, fumarates, itaconates, citraconates wherein the alkyl group in each instance contains from 1 to 4 carbon atoms, e.g. dimethyl maleate, dibutyl fumarate, etc., amides and ester-amides such as fumaramide, maleamide, itaconamide, N-methyl fumaramide, N,N'-diethyl fumaramide, etc., fumaramates, maleamates, itaconamates, citraconamates, ethylene, isobutylene, propylene, and the like. Any amount of comonomer up to 50% by weight of the monomeric mixture can be used. However, the preferred proportions are from about 70 to 95% by weight of acrylonitrile and from 30 to 5% by weight of the comonomer. Thus, the process of the invention has an overall scope of proportions of from 50 to 100% of acrylonitrile and from 50 to 0% by weight, i.e., up to 50%, of at least one other polymerizable monomer. In general, the proportions of the substituents in the copolymers are the same as in the starting polymerization reaction mixtures.

The process of the invention can also be carried out with advantage by including various additives in the polymerization mixtures. Chain transfer agents such as phenols and alkyl mercaptans may be added in amounts of from 0.01–2.0% based on the weight of monomer. Pigments for delustering or for coloring fibers and films can be added before polymerization or just before spinning or casting. The process can also be operated in continuous manner wherein the ingredients are added continuously and the resulting polymer solution is continuously withdrawn from the system.

Preferably, normal atmospheric pressures are used, but lower or higher than atmospheric pressures also are operable and can be employed, if desired.

The following examples serve further to illustrate the manner of practicing the process of the invention.

Examples 1 to 8 illustrate the preparation of acrylonitrile polymers, in solution, employing gold and salts thereof and an oxidizing agent as polymerization initiators.

*Example 1*

One hundred grams of acrylonitrile was mixed with 300 ml. of ethylene carbonate at 35° C. Ten milligrams of auric chloride and 0.75 g. of potassium persulfate were added and the mixture was stirred under a nitrogen atmosphere for 4 hours. At this time the composition of the resultant viscous solution was found to be 97 grams of polyacrylonitrile with an intrinsic viscosity of 2.65. This solution was clear and substantially colorless. Fibers were made using a wet-spinning procedure. These fibers were nearly white and had a tensile strength of 4.10 g./den.

*Example 2*

One hundred grams of acrylonitrile was mixed with 300 ml. of N,N-dimethylformamide at 45° C. Forty milligrams of auric chloride and 1.5 grams of potassium persulfate were added and the mixture was stirred for 5 hours under a nitrogen atmosphere. A viscous solution was the result at this time and analysis showed a 92.3% conversion of the acrylonitrile monomer to polymer. This solution was clear and substantially colorless. Fibers were spun from this solution by extruding the solution into a heated chamber. The resulting fibers were drafted and heat-set. The properties of these fibers are listed in the following table.

| | |
|---|---|
| Color | Essentially white |
| Strength, g./den. | 3.88 |
| Denier | 10 |
| Elongation, percent | 16.3 |
| Sticking temperature, ° C. | 235–242 |
| Flow point, ° C. | 210–220 |

*Example 3*

Three hundred grams of acrylonitrile was polymerized in 900 ml. of N,N-dimethylformamide using 120 mg. of auric chloride, 4.5 grams of potassium persulfate and the condition described in Example 2. The resulting viscous solution was divided into two parts. One part was converted to fibers by a wet-spinning technique. The fibers had the following properties:

| | |
|---|---|
| Color | White |
| Strength, g./den. | 4.3 |
| Denier | 4 |
| Elongation, percent | 14.2 |
| Sticking temperature, °C. | 233–238 |
| Flow point, °C. | 220–225 |

The remaining portion of the solution was converted into films of polyacrylonitrile by spreading the solution on metal plates at 80–150° C. These films were colorless or had a very light straw color. The films could be drafted to give tough, flexible films.

*Example 4*

Ninety-three grams of acrylonitrile, 7 g. of methyl acrylate, and 300 ml. of dimethyl sulfoxide were mixed at 20° C. Five milligrams of auric chloride and 0.75 g. of Caro's acid ($H_2SO_5$) were added and the mixture was stirred under a nitrogen atmosphere for 3.5 hours. After this time a viscous solution was observed to contain 97.5 g. of polymer having an intrinsic viscosity of 2.68. The solution was essentially colorless and could be converted into films or fibers by solvent extraction using water or mixtures of water and water-miscible organic liquids.

*Example 5*

Using the technique described in Example 4, the same polymer composition was prepared in γ-butyrolactone. This polymer had similar properties and could be converted to films and fibers by the same method.

*Example 6*

Ninety-three grams of acrylonitrile, 7 grams of ethyl acrylate, and 400 ml. of ethylene carbonate were mixed together. One gram of finely divided titanium dioxide, 0.5 gram of t-dodecylmercaptan, 25 mg. of auric chloride, and 0.75 gram of potassium persulfate were added and this mixture was then stirred under a nitrogen atmosphere for 4.5 hours. After this time analysis showed a 96.5% conversion of the monomers to polymer which had the composition 93% acrylonitrile and 7% ethyl acrylate units.

*Example 7*

Eighty grams of acrylonitrile, 20 grams of N,N-dimethylacrylamide, and 300 grams of N,N-dimethylacetamide were mixed together. One gram of finely divided titanium dioxide, 10 mg. of auric chloride, and 1.2 g. of potassium persulfate were added and this mixture was stirred for 3.5 hours at 40° C. The resulting polymer solution was spun into fibers using a wet-spinning technique. The fibers had excellent strength properties and dyed well with acetate and acid wool dyes.

*Example 8*

Ninety-three grams of acrylonitrile, 4 grams of methyl acrylate and 3 grams of sodium allyl sulfonate were mixed with 300 ml. of ethylene carbonate which contained 16 mg. of finely divided gold metal and 0.5 gram of potassium persulfate. This mixture was stirred at 30° C. under a nitrogen atmosphere for 5 hours. A viscous solution of the terpolymer composed of 93% acrylonitrile, 4% methyl acrylate, and 3% sodium allyl sulfonate was obtained. This polymer was spun into fibers using a wet-spinning technique. These fibers dyed well with basic dyes.

Examples 9 to 16 illustrate the preparation of acrylonitrile polymers, in solution, employing platinum and salts thereof and an oxidizing agent as polymerization initiators.

*Example 9*

One hundred grams of acrylonitrile were mixed with 300 ml. of ethylene carbonate at 35° C. Ten milligrams of chloroplatinic acid and 0.75 gram of potassium persulfate were added and the mixture was stirred under a nitrogen atmosphere for 4 hours. At this time the composition of the resultant viscous solution was found to be 97 grams of polyacrylonitrile with an intrinsic viscosity of 2.65. This solution was clear and substantially colorless. Fibers were made using a wet-spinning procedure. These fibers were nearly white and had a tensile strength of 4.10 g./den.

*Example 10*

One hundred grams of acrylonitrile were mixed with 300 ml. of N,N-dimethylformamide at 45° C. Forty milligrams of chloroplatinic acid and 1.5 grams of potassium persulfate were added and the mixture was stirred for 5 hours under a nitrogen atmosphere. A viscous solution was the result at this time and analysis showed a 92.3% conversion of the acrylonitrile monomer to polymer. This solution was clear and substantially colorless. Fibers were spun from this solution by extruding the solution into a heated chamber. The resulting fibers were drafted and heat-set. The properties of these fibers are listed in the following table.

| | |
|---|---|
| Color | Essentially white |
| Strength, g./den. | 3.88 |
| Denier | 10 |
| Elongation, percent | 16.3 |
| Sticking temp., °C. | 235–242 |
| Flow point, °C. | 210–220 |

*Example 11*

Three hundred grams of acrylonitrile were polymerized in 900 ml. of N,N-dimethylformamide using 120 mg. of chloroplatinic acid, 4.5 grams of potassium persulfate, and the condition described in Example 10. The resulting viscous solution was divided into two parts. One part was converted to fibers by a wet-spinning technique. The fibers had the following properties:

| | |
|---|---|
| Color | White |
| Strength, g./den. | 4.3 |
| Denier | 4 |
| Elongation, percent | 1.42 |
| Sticking temp., °C. | 233–238 |
| Flow point, °C. | 220–225 |

The remaining portion of the solution was converted into films of polyacrylonitrile by spreading the solution on metal plates at 80–150° C. These films were colorless or had a very light straw color. The films could be drafted to give tough, flexible films.

*Example 12*

Ninety-three grams of acrylonitrile, 7 grams of methyl acrylate, and 300 ml. of dimethyl sulfoxide were mixed at 20° C. Five milligrams of chloroplatinic acid and 0.75 gram of Caro's acid ($H_2SO_5$) were added and the mixture was stirred under a nitrogen atmosphere for 3.5 hours. After this time a viscous solution was observed to contain 97.5 grams of polymer having an intrinsic viscosity of 2.68. The solution was essentially colorless and could be converted into films or fibers by solvent extraction using water or mixtures of water and water-miscible organic liquids.

*Example 13*

Using the technique described in Example 12, the same polymer composition was prepared in γ-butyrolactone. This polymer had similar properties and could be converted to films and fibers by the same method.

*Example 14*

Ninety-three grams of acrylonitrile, 7 grams of ethyl acrylate, and 400 ml. of ethylene carbonate were mixed together. One gram of finely divided titanium dioxide, 0.5 gram of t-dodecylmercaptan, 25 mg. of chloroplatinic acid, and 0.75 gram of potassium persulfate were added and this mixture was then stirred under a nitrogen atmosphere for 4.5 hours. After this time, analysis showed a 96.5% conversion of the monomers to polymer which had the composition 93% acrylonitrile and 7% ethyl acrylate units.

*Example 15*

Eighty grams of acrylonitrile, 20 grams of N,N-dimethylacrylamide, and 300 grams of N,N-dimethylacetamide were mixed together. One gram of finely divided titanium dioxide, 10 mg. of chloroplatinic acid, and 1.2 grams of potassium persulfate were added and this mixture was stirred for 3.5 hours at 40° C. The resulting polymer solution was spun into fibers using a wet-spinning technique. The fibers had excellent strength properties and dyed well with acetate and acid wool dyes.

*Example 16*

Nine-three grams of acrylonitrile, 4 grams of methyl acrylate, and 3 grams of sodium allyl sulfonate were mixed with 300 ml. of ethylene carbonate which contained 16 mg. of finely divided platinum metal and 0.5 gram of potassium persulfate. This mixture was stirred at 30° C. under a nitrogen atmosphere for 5 hours. A viscous solution of the terpolymer composed of 93% acrylonitrile, 4% methyl acrylate, and 3% sodium allyl sulfonate was obtained. This polymer was spun into fibers using a wet-spinning technique. These fibers dyed well with basic dyes.

Examples 17 to 24 illustrate the preparation of acrylonitrile polymers, in solution, employing palladium and salts thereof and an oxidizing agent as polymerization initiators.

*Example 17*

One hundred grams of acrylonitrile were mixed with 300 ml. of ethylene carbonate at 35° C. Ten milligrams of palladium chloride and 0.75 gram of potassium persulfate were added and the mixture was stirred under a nitrogen atmosphere for 4 hours. At this time the composition of the resultant viscous solution was found to be 97 grams of polyacrylonitrile with an intrinsic viscosity of 2.65. This solution was clear and substantially colorless. Fibers were made using a wet-spinning procedure. These fibers were nearly white and had a tensile strength of 4.10 g./den.

*Example 18*

One hundred grams of acrylonitrile were mixed with 300 ml. of N,N-dimethylformamide at 45° C. Forty milligrams of palladium chloride and 1.5 grams of potassium persulfate were added and the mixture was stirred for 5 hours under a nitrogen atmosphere. A viscous solution was the result at this time and analysis showed a 92.3% conversion of the acrylonitrile monomer to polymer. This solution was clear and substantially colorless. Fibers were spun from this solution by extruding the solution into a heated chamber. The resulting fibers were drafted and heat-set. The properties of these fibers are listed in the following table:

| | |
|---|---|
| Color | Essentially white |
| Strength, g./den. | 3.88 |
| Denier | 10 |
| Elongation, percent | 16.3 |
| Sticking temp., ° C. | 235–242 |
| Flow point, ° C. | 210–220 |

*Example 19*

Three hundred grams of acrylonitrile were polymerized in 900 ml. of N,N-dimethylformamide using 120 mg. of palladium chloride, 4.5 grams of potassium persulfate, and the condition described in Example 18. The resulting viscous solution was divided into two parts. One part was converted to fibers by a wet-spinning technique. The fibers had the following properties:

| | |
|---|---|
| Color | White |
| Strength, g./den. | 4.3 |
| Denier | 4 |
| Elongation, percent | 14.2 |
| Sticking temp., ° C. | 233–238 |
| Flow point, ° C. | 220–225 |

The remaining portion of the solution was converted into films of polyacrylonitrile by spreading the solution on metal plates at 80–150° C. These films were colorless or had a very light straw color. The films could be drafted to give tough, flexible films.

*Example 20*

Ninety-three grams of acrylonitrile, 7 grams of methyl acrylate, and 300 ml. of dimethyl sulfoxide were mixed at 20° C. Five milligrams of palladium chloride and 0.75 gram of Caro's acid ($H_2SO_5$) were added and the mixture was stirred under a nitrogen atmosphere for 3.5 hours. After this time a viscous solution was observed to contain 97.5 grams of polymer having an intrinsic viscosity of 2.68. The solution was essentially colorless and could be converted into films or fibers by solvent extraction using water and water-miscible organic liquids.

*Example 21*

Using the technique described in Example 20, the same polymer composition was prepared in γ-butyrolactone. This polymer had similar properties and could be converted to films and fibers by the same method.

*Example 22*

Ninety-three grams of acrylonitrile, 7 grams of ethyl acrylate, and 400 ml. of ethylene carbonate were mixed together. One gram of finely divided titanium dioxide, 0.5 gram of t-dodecylmercaptan, 25 mg. of palladium chloride, and 0.75 gram of potassium persulfate were added and this mixture was then stirred under a nitrogen atmosphere for 4.5 hours. After this time analysis showed a 96.5% conversion of the monomers to polymer which had the composition 93% acrylonitrile and 7% ethyl acrylate units.

*Example 23*

Eighty grams of acrylonitrile, 20 grams of N,N-dimethylacrylamide, and 300 grams of N,N-dimethylacetamide were mixed together. One gram of finely divided titanium dioxide, 10 mg. of palladium chloride, and 1.2 grams of potassium persulfate were added and this mixture was stirred for 3.5 hours at 40° C. The resulting polymer solution was spun into fibers using a wet-spinning technique. The fibers had excellent strength properties and dyed well with acetate and acid wool dyes.

*Example 24*

Ninety-three grams of acrylonitrile, 4 grams of methyl acrylate, and 3 grams of sodium allyl sulfonate were mixed with 300 ml. of ethylene carbonate which contained 16 mg. of finely divided palladium metal and 0.5 gram of potassium persulfate. This mixture was stirred at 30° C. under a nitrogen atmosphere for 5 hours. A viscous solution of the terpolymer composed of 93% acrylonitrile, 4% methyl acrylate, and 3% sodium allyl sulfonate was obtained. This polymer was spun into fibers using a wet-spinning technique. These fibers dyed well with basic dyes.

Examples 25 to 32 illustrate the preparation of acrylonitrile polymers, in solution, employing iridium and salts thereof and an oxidizing agent as polymerization initiators.

*Example 25*

One hundred grams of acrylonitrile was mixed with 300 ml. of ethylene carbonate at 35° C. Ten milligrams of iridium chloride and 0.75 gram of potassium persulfate were added and the mixture was stirred under a nitrogen atmosphere for 4 hours. At this time the composition of the resultant viscous solution was found to be 97 grams of polyacrylonitrile with an intrinsic viscosity of 2.65. This solution was clear and substantially colorless. Fibers were made using a wet-spinning procedure. These fibers were nearly white and had a tensile strength of 4.10 g./den.

Example 26

One hundred grams of acrylonitrile were mixed with 300 ml. of N,N-dimethylformamide at 45° C. Forty milligrams of iridium chloride and 1.5 grams of potassium persulfate were added and the mixture was stirred for 5 hours under a nitrogen atmosphere. A viscous solution was the result at this time and analysis showed a 92.3% conversion of the acrylonitrile monomer to polymer. This solution was clear and substantially colorless. Fibers were spun from this solution by extruding the solution into a heated chamber. The resulting fibers were drafted and heat-set. The properties of these fibers are listed in the following table:

| | |
|---|---|
| Color | Essentially white |
| Strength, g./den. | 3.88 |
| Denier | 10 |
| Elongation, percent | 16.3 |
| Sticking temp., ° C. | 235–242 |
| Flow point, ° C. | 210–220 |

Example 27

Three hundred grams of acrylonitrile were polymerized in 900 ml. of N,N-dimethylformamide using 120 mg. of iridium chloride, 4.5 grams of potassium persulfate, and the condition described in Example 26. The resulting viscous solution was divided into two parts. One part was converted to fibers by a wet-spinning technique. The fibers had the following properties:

| | |
|---|---|
| Color | White |
| Strength, g./den. | 4.3 |
| Denier | 4 |
| Elongation, percent | 14.2 |
| Sticking temp., ° C. | 233–238 |
| Flow point, ° C. | 220–225 |

The remaining portion of the solution was converted into films of polyacrylonitrile by spreading the solution on metal plates at 80–150° C. These films were colorless or had a very light straw color. The films could be drafted to give tough, flexible films.

Example 28

Ninety-three grams of acrylonitrile, 7 grams of methyl acrylate, and 300 ml. of dimethyl sulfoxide were mixed at 20° C. Five milligrams of iridium chloride and 0.75 gram of Caro's acid ($H_2SO_5$) were added and the mixture was stirred under a nitrogen atmosphere for 3.5 hours. After this time a viscous solution was observed to contain 97.5 grams of polymer having an intrinsic viscosity of 2.68. The solution was essentially colorless and could be converted into films or fibers by solvent extraction using water or mixtures of water and water-miscible organic liquids.

Example 29

Using the technique described in Example 28, the same polymer composition was prepared in γ-butyrolactone. This polymer had similar properties and could be converted to films and fibers by the same method.

Example 30

Ninety-three grams of acrylonitrile, 7 grams of ethyl acrylate, and 400 ml. of ethylene carbonate were mixed together. One gram of finely divided titanium dioxide, 0.5 gram of t-dodecylmercaptan, 25 mg. of iridium chloride, and 0.75 gram of potassium persulfate were added and this mixture was then stirred under a nitrogen atmosphere for 4.5 hours. After this time analysis showed a 96.5% conversion of the monomers to polymer which had the composition 93% acrylonitrile and 7% ethyl acrylate units.

Example 31

Eighty grams of acrylonitrile, 20 grams of N,N-dimethylacrylamide, and 300 grams of N,N-dimethylacetamide were mixed together. One gram of finely divided titanium dioxide, 10 mg. of iridium chloride, and 1.2 grams of potassium persulfate were added and this mixture was stirred for 3.5 hours at 40° C. The resulting polymer solution was spun into fibers using a wet-spinning technique. The fibers had excellent strength properties and dyed well with acetate and acid wool dyes.

Example 32

Ninety-three grams of acrylonitrile, 4 grams of methyl acrylate, and 3 grams of sodium allyl sulfonate were mixed with 300 ml. of ethylene carbonate which contained 16 mg. of finely divided iridium metal and 0.5 gram of potassium persulfate. This mixture was stirred at 30° C. under a nitrogen atmosphere for 5 hours. A viscous solution of the terpolymer composed of 93% acrylonitrile, 4% methyl acrylate, and 3% sodium allyl sulfonate was obtained. This polymer was spun into fibers using a wet-spinning technique. These fibers dyed well with basic dyes.

By substituting in the above examples, other of the mentioned gold, platinum, palladium and iridium salts, generally similar polymer solutions and shaped articles can be obtained. Also, the comonomers in the examples may be replaced with a like amount or in any amount within the specified range of up to 50% with any other unsaturated compounds that have been mentioned as suitable, for example, with methacrylonitrile to give copolymers of acrylonitrile and methacrylonitrile, with 4-vinylpyridine to give copolymers of acrylonitrile and 4-vinylpyridine, with styrene to give copolymers of acrylonitrile and styrene, with N-vinyl pyrrolidone to give copolymers of acrylonitrile and N-vinyl pyrrolidone, etc., similar solutions are obtained which likewise can be directly coated or spun into shaped articles of excellent physical properties.

Although we do not wish to be bound to any particular theory it is believed that the presence of the metal component of the catalyst serves to lower the activation energy for the initiation of a particular polymer chain. We also believe that the lowered energy requirement is a result of an association or complex formation between the monomer molecule and the metal atom or ion. We further believe that larger quantities of these metals in relation to the monomer molecules may affect the nature of the polymer produced. However, the quantities described in this invention do not result in polymers which have significantly modified properties as compared to the same polymer composition prepared with more conventional catalysts in water systems.

The new process of the invention has many advantages. The polymer is obtained as a solution suitable for direct spinning to fibers and filaments or direct coating to films, sheets and other shaped articles. This capability eliminates many laborious and time-consuming steps as compared, for example, to previously proposed processes employing aqueous or other nonsolvent reaction media wherein is involved (1) precipitation of emulsified polymer, (2) filtering and washing of polymer cake, (3) drying polymer, (4) dissolving the polymer and (5) filtering the polymer solution before the final product can be used.

However, the process of the invention is particularly advantageous primarily because of the catalyst system employed therein. We have found that a select group of gold containing, platinum containing, palladium containing and iridium containing catalysts are highly efficacious in combination with certain oxidizing agents for the solution polymerization of arcylonitrile. This group consists of the finely divided metals and the various salts of these metals. The presence of this catalyst system permits the polymerization reaction with acrylonitrile to be carried out smoothly to high molecular weight products at relatively low temperatures and in a minimum period of time. This is in marked contrast to previously known processes which produce polymers of acrylonitrile in solvents for the polymer wherein relatively long reaction periods are necessary and the resulting polymers are obtained as low yields of low-molecular weight polymer which are frequently undesirably colored.

The invention has been described in detail with particular reference to preferred embodiments thereof, but it will be understood that variations and modifications can be effected within the spirit and scope of the invention as hereinabove described and as defined in the appended claims.

What we claim is:

1. A process for preparing a solution of acrylonitrile polymer which comprises polymerizing acrylonitrile in an organic liquid which is a solvent for polyacrylonitrile, at a temperature of from −70 to 100° C., with at least about 0.0001 to 3.0 percent of a metal selected from the group consisting of gold, platinum, palladium and iridium and salts of said metals about 0.025 to 2.0 percent of an oxidizing agent selected from the group consisting of monoperoxysulfuric acid, peroxydisulfuric acid, ammonium salt of monoperoxysulfuric acid, ammonium salt or peroxydisulfuric acid, an alkyl metal salt of monoperoxysulfuric acid, and alkali metal salt of peroxydisulfuric acid and sulfur tetroxide in combination with water.

2. The process of claim 21 wherein the said catalyst is a gold salt.

3. The process of claim 21 wherein the said catalyst is a platinum salt.

4. The process of claim 21 wherein the said catalyst is a palladium salt.

5. The process of claim 21 wherein the said catalyst is an iridium salt.

6. The process of claim 21 wherein the said catalyst is in the form of finely divided metal.

7. The process of claim 21 carried out in continuous manner.

8. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20 to 50° C., with from 0.001–1% of auric chloride based on the weight of said monomeric material, and from 0.025–2% of potassium persulfate based on the weight of said monomeric material.

9. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20–50° C., with from 0.001–1% of chloroplatinic acid based on the weight of said monomeric material, and from 0.025–2% of potassium persulfate based on the weight of said monomeric material.

10. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20–50° C., with from 0.001–1% of palladium chloride based on the weight of said monomeric material, and from 0.025–2% of potassium persulfate based on the weight of said monomeric material.

11. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20–50° C., with from 0.001–1% of iridium dichloride based on the weight of said monomeric material, and from 0.025–2% of potassium persulfate based on the weight of said monomeric material.

12. A process for preparing a solution of polyacrylonitrile which can be used directly to make shaped articles which comprises polymerizing acrylonitrile in N,N-dimethylformamide, at a temperature of from 20–50° C., with from 0.001–1% of auric chloride based on the weight of said acrylonitrile, and from 0.025–2% of potassium persulfate based on the weight of said acrylonitrile.

13. A process for preparing a solution of polyacrylonitrile which can be used directly to make shaped articles which comprises polymerizing acrylonitrile in N,N-dimethylformamide, at a temperature of from 20–50° C., with from 0.001–1% of chloroplatinic acid based on the weight of said acrylonitrile, and from 0.025–2% of potassium persulfate based on the weight of said acrylonitrile.

14. A process for preparing a solution of polyacrylonitrile which can be used directly to make shaped articles which comprises polymerizing acrylonitrile in N,N-dimethylformamide, at a temperature of from 20–50° C., with from 0.001–1% of palladium chloride based on the weight of said acrylonitrile, and from 0.025–2% of potassium persulfate based on the weight of said acrylonitrile.

15. A process for preparing a solution of polyacrylonitrile which can be used directly to make shaped articles which comprises polymerizing acrylonitrile in N,N-dimethylformamide, at a temperature of from 20–50° C., with from 0.001–1% of iridium dichloride based on the weight of said acrylonitrile, and from 0.025–2% of potassium persulfate based on the weight of said acrylonitrile.

16. A process for preparing a solution of a copolymer of acrylonitrile and methyl acrylate which can be used directly to make shaped articles which comprises polymerizing monomeric material consisting of from 70–95% by weight of acrylonitrile and from 30–5% by weight of methyl acrylate, in N,N-dimethylformamide, at a temperature of from 20–50° C., with from 0.001–1% of auric chloride based on the weight of said monomeric material, and from 0.025–2% of potassium persulfate based on the weight of monomeric material.

17. A process for preparing a solution of a copolymer of acrylonitrile and methyl acrylate which can be used directly to make shaped articles which comprises polymerizing a monomeric material consisting of from 70–95% by weight of acrylonitrile and from 30–5% by weight of ethyl acrylate, in N,N-dimethylformamide, at a temperature of from 20–50° C., with from 0.001–1% of chloroplatinic acid based on the weight of said monomeric material, and from 0.025–2% of potassium persulfate based on the weight of monomeric material.

18. A process for preparing a solution of a copolymer of acrylonitrile and methyl acrylate which can be used directly to make shaped articles which comprises polymerizing monomeric material consisting of from 70–95% by weight of acrylonitrile and from 30–5% by weight of methyl acrylate, in N,N-dimethylformamide, at a temperature of from 20–50° C., with from 0.001–1% of palladium chloride based on the weight of monomeric material, and from 0.025–2% of potassium persulfate based on the weight of monomeric material.

19. A process for preparing a solution of a copolymer of acrylonitrile and ethyl acrylate which can be used directly to make shaped articles which comprises polymerizing monomeric material consisting of from 70–95% by weight of acrylonitrile and from 30–5% by weight of ethyl acrylate, in N,N-dimethylformamide, at a temperature of from 20–50° C., with from 0.001–1% of iridium dichloride based on the weight of monomeric material, and from 0.025–2% of potassium persulfate based on the weight of monomeric material.

20. A process according to claim 1 wherein said solvent for polyacrylonitrile is N,N-dimethylformamide, ethylene carbonate, N,N-dimethylacetamide, dimethylsulfoxide or γ-butyrolactone.

21. A process for preparing a solution of acrylonitrile polymer which can be used directly to make shaped articles which comprises polymerizing monomeric material consisting of from 50–100% by weight of acrylonitrile and up to 50% by weight to make a total of 100% of at least one other monoethylenically unsaturated, polymerizable compound containing a single $CH_2$=C< group, in an organic liquid which is a solvent for polyacrylonitrile, at a temperature of from —70 to 100° C., with (1) from about 0.0001 to about 3.0% by weight based on monomer weight of a catalyst selected from the group consisting of gold, platinum, palladium, iridium and salts of said metals and (2) from about 0.025 to about 2.0% based on monomer weight of an oxidizing agent selected from the group consisting of monoperoxysulfuric acid, peroxydisulfuric acid, ammonium salt of monoperoxysulfuric acid, ammonium salt of peroxydisulfuric acid, an alkali metal salt of monoperoxysulfuric acid, an alkali metal salt of peroxydisulfuric acid and sulfur tetroxide in combination with water.

References Cited
UNITED STATES PATENTS

| | | | |
|---|---|---|---|
| 2,768,148 | 10/1956 | Schildknecht et al. | 260—88.7 |
| 2,794,793 | 6/1957 | Coover | 260—88.7 |
| 2,858,290 | 10/1958 | Davis et al. | 260—30.8 |
| 3,020,265 | 2/1962 | Tietz | 260—88.7 |
| 3,060,157 | 10/1962 | Goodman et al. | 260—85.5 |
| 3,069,402 | 12/1962 | Smart | 260—85.5 |
| 3,145,194 | 8/1964 | Heckmaier et al. | 260—88.7 |

OTHER REFERENCES

Csuros et al.: Chem. Abstracts, vol. 53 (1959), page 1905h.

MORRIS LIEBMAN, *Primary Examiner.*

B. A. AMERNICK, *Assistant Examiner.*

UNITED STATES PATENT OFFICE
CERTIFICATE OF CORRECTION

Patent No. 3,328,332                                                June 27, 1967

Clarence C. Dannelly et al.

It is hereby certified that error appears in the above numbered patent requiring correction and that the said Letters Patent should read as corrected below.

Column 3, line 37, for "allyl" read -- alkyl --; line 38, for "alky" read -- alkyl --; column 6, line 42, for "1.42" read -- 14.2 --; column 11, line 31, for "alkyl" read -- alkali --.

Signed and sealed this 5th day of November 1968.

(SEAL)
Attest:

Edward M. Fletcher, Jr.                                   EDWARD J. BRENNER
Attesting Officer                                                   Commissioner of Patents